US009191592B2

United States Patent
Baer et al.

(10) Patent No.: US 9,191,592 B2
(45) Date of Patent: Nov. 17, 2015

(54) IMAGING SENSOR ANOMALOUS PIXEL COLUMN DETECTION AND CALIBRATION

(71) Applicant: Apple Inc., Cupertino, CA (US)

(72) Inventors: Richard L. Baer, Los Altos, CA (US); Haitao Guo, San Jose, CA (US); Shannon L. Gardiner, San Francisco, CA (US); Ting Chen, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 51 days.

(21) Appl. No.: 13/629,455

(22) Filed: Sep. 27, 2012

(65) Prior Publication Data

US 2013/0222608 A1    Aug. 29, 2013

Related U.S. Application Data

(60) Provisional application No. 61/605,043, filed on Feb. 29, 2012.

(51) Int. Cl.
*H04N 17/00* (2006.01)
*H04N 17/02* (2006.01)
*H04N 5/365* (2011.01)

(52) U.S. Cl.
CPC ............ *H04N 5/3658* (2013.01); *H04N 17/002* (2013.01)

(58) Field of Classification Search
CPC .... H04N 5/3658; H04N 17/002; H04N 17/06
USPC .......................................... 348/243, 189, 187
See application file for complete search history.

(56) References Cited

U.S. PATENT DOCUMENTS

| | | | |
|---|---|---|---|
| 4,400,734 A | 8/1983 | Davy | |
| 6,737,625 B2 | 5/2004 | Baharav et al. | |
| 6,912,322 B2 | 6/2005 | Smith et al. | |
| 7,126,631 B1 * | 10/2006 | Minemier | 348/246 |
| 7,304,670 B1 | 12/2007 | Hussey et al. | |
| 8,013,916 B2 * | 9/2011 | Rosen | 348/246 |
| 8,089,533 B2 | 1/2012 | Hara | |
| 2003/0053142 A1 * | 3/2003 | Wengender | 358/437 |
| 2006/0082675 A1 * | 4/2006 | McGarvey et al. | 348/362 |
| 2007/0252904 A1 * | 11/2007 | Rosen | 348/241 |

(Continued)

OTHER PUBLICATIONS

Liu, Li, "A Defect Detection Scheme for Hi-End CMOS Image Sensor", International Symposium on Photoelectronic Detection and Imaging, 2009, Proc. of SPIE vol. 7384, (7 pages).

(Continued)

*Primary Examiner* — Antoinette Spinks
(74) *Attorney, Agent, or Firm* — Blakely, Sokoloff, Taylor & Zafman LLP (57) ABSTRACT

An imaging sensor is signaled to capture a digital image of a dark scene. For each of the pixel columns in the image, a respective column value is computed that represents at least some of the pixels in the column. For each of the pixel columns in the image, a respective comparison is made between the respective column value of the pixel column and a reference value. A respective column score is computed, for each of the pixel columns, based on the respective comparison. An indication that identifies one or more of the pixel columns as anomalous is stored, when the respective column score of the one or more the pixel columns does not meet a criterion. Other embodiments are also described and claimed.

18 Claims, 5 Drawing Sheets

(56) References Cited

U.S. PATENT DOCUMENTS

| | | |
|---|---|---|
| 2010/0214450 A1* | 8/2010 | Rosen .......................... 348/246 |
| 2010/0220193 A1 | 9/2010 | Hogasten et al. |
| 2010/0262210 A1 | 10/2010 | Parramon et al. |
| 2011/0157434 A1 | 6/2011 | Gerstenberger et al. |
| 2011/0221599 A1* | 9/2011 | Hogasten .................... 340/632 |

OTHER PUBLICATIONS

Tanbakuchi, Anthony A., et al., "Adaptive Pixel Defect Correction", 2003 Electronic Imaging Conference, Copyright 2003 SPIE and IS&T, (11 pages).

* cited by examiner

IMAGING SENSOR ANOMALOUS PIXEL COLUMN DETECTION AND CALIBRATION

RELATED MATTERS

This non-provisional application claims the benefit of the earlier filing date of provisional application No. 61/605,043, filed Feb. 29, 2012.

FIELD

An embodiment of the invention is related to techniques for testing an imaging sensor by finding anomalous pixel columns in a digital image produced by the sensor, and providing a calibration map for calibrating the imaging sensor. Other embodiments are also described.

BACKGROUND

Solid state imaging sensors are used in a wide variety of consumer electronics products such as smart phones, tablet computers, laptop computers, as well as desktop units. A typical imaging sensor is an integrated circuit die that has an array of photo sensors and is positioned at a focal plane of an optical (lens) system that is to be aimed at a scene to be captured. When a user signals a shutter release, namely that a picture is to be taken, sensor controller circuitry will reset the sensor array and then allow it to respond to incident light from the scene. A conventional higher resolution imaging sensor has millions of photo sensors, and relatively complex analog signal conditioning and routing circuitry that serves to collect all of the photo sensor analog signals and convert them into digital form (using analog-to-digital conversion circuitry, ADC). To make this collection and conversion process more efficient, one or more columns of photo sensors are wired to share the same analog signal conditioning and multiplexing circuitry, and also the same ADC (generally referred to as column circuitry). In such a column-based approach, manufacturing variations from one column circuit to another will cause the resulting digitized image to exhibit vertical streaks (either bright or dark streaks), commonly referred to as vertical fixed pattern noise, VFPN, or column noise, even though the photo sensors may all be exposed to the same, uniform incident light. This, of course, degrades the quality of the digital image and therefore has received the attention of imaging system developers.

The noise or offset exhibited by a given column may be detected by computing the difference between an average photo sensor signal from one column and an ideal or expected value. This measure of the offset is then stored in non-volatile memory as an offset value, and may then be used to calibrate the imaging sensor by subtracting the offset value from the pixel column accordingly (each time the imaging sensor is used to take a picture).

SUMMARY

Conventional techniques for testing imaging sensors are able to detect relatively high VFPN levels, i.e. greater than one equivalent pixel electron ("e–"). Such techniques, however, are not able to reliably detect substantially lower levels of column noise. It has been found that when certain image processing techniques are used to enhance a raw digital image from the imaging sensor, e.g. to yield a digital image that is more suitable for use by a bit map graphics editor, for printing, or for display by, for example, a typical web browser, column noise levels of less than one e– may still be disturbing to the user. Visible bright streaks appear when such post-processed digital images were taken under dim scene lighting conditions. Accordingly, a technique is needed that can detect column noise in the range from approximately 0.1 e– to 1.0 e–. Note that in typical testing procedures, spatially and temporally random read noise levels of about 3 e– may be tolerated by the human visual system. However, since the latter is more sensitive to row and column features, rather than randomly occurring noise, the permissible column noise needs to be several times lower than the random read noise.

An embodiment of the invention is a method for finding an anomalous pixel column produced by an imaging sensor, as follows. The imaging sensor is signaled to capture a digital image of a dark scene. In one embodiment, the scene is dark in that it has essentially no visible light and no infrared light that would produce a substantial response from the sensor. The scene is dark in that the resulting digital image should have no pixel intensity values that are greater than about 10% of full scale (or maximum digital number), except for those in any anomalous pixel column. That is because the particular anomaly that is to be detected here is a bright column, which is not likely to be apparent to a human being when the scene is considered bright. The dark scene as used here may be completely dark such as when a mechanical shutter of a camera module containing the imaging sensor is completely closed, or the camera lens is completely blocked off; alternatively, the imaging sensor may be placed in a dark chamber.

In addition to the dark scene, to enable a relatively low detection threshold as desired here, the imaging sensor needs to be configured with a suitable exposure setting. Thus, both an analog gain (that is applied to photo sensor signals prior to A/D conversion) and photo sensor integration time may be set to be in the high end of their available ranges, for example between 75% and 100% of full scale. Such a combination of the dark scene and the correct exposure setting may be designed to allow a detection threshold for column noise of less than one equivalent pixel electron, such as between approximately 0.1 e– to 1.0 e–.

Once the image of the dark scene has been captured, the method continues with computing a respective column value that represents at least some, if not all, of the pixel cells in each column of the image. For each of the columns, one or more respective comparisons are then made between the respective column value and one or more reference values. The reference values may be the respective column values of several adjacent neighbor columns. A respective column noise score is then computed for each of the columns, based on the comparisons. A calibration map is then stored (in non-volatile storage) that identifies which of the pixel columns are anomalous, i.e. their column noise scores do not meet a predetermined criterion.

It has been found that there may be a small amount of clipping at very low photo sensor signal levels, such as those produced when the imaging sensor is under a dark scene. This may be due to lag (charge trapping in the photo sensor) or analog-to-digital conversion offset issues, as well as other difficulties in analog signal conditioning (by the column circuits). The relatively low levels of column noise sought to be detected here may not be observable in the presence of such clipping. Such clipping, however, may be prevented by adding a small amount of bias signal, to the output of the photo sensor. Of course, if this bias signal is too large, for instance due to too much light being introduced into an otherwise dark scene, the shot noise associated with the photo sensor signal will make the column noise once again unobservable. A very low level of bias has thus been found to be appropriate, on the order of about 1 e–. This may translate into at least a 0.5 digital number (DN), at the output of the analog-to-digital conversion process. In accordance with an embodiment of the invention, the bias signal is created in the form of additional dark current, that is charge that has been produced in the photo sensor in the absence of light (dark scene), by adjusting the two parameters of integration time and imaging sensor temperature during exposure, to obtain between 1 e– and 2 e– bias in the photo sensor signal.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments of the invention with reference to the appended drawings are now explained. While numerous details are set forth, it is understood that some embodiments of the invention may be practiced without these details. In other instances, well-known circuits, structures, and techniques have not been shown in detail so as not to obscure the understanding of this description.

An embodiment of the invention is a process for testing imaging sensors. The process may detect multiple anomalous pixel columns, or it may detect none at all. A threshold can be set for the maximum number of anomalous columns, such that if too many anomalous columns are detected, the imaging sensor is marked as a fail, that is, do not ship. If fewer than the number of threshold columns are found to be anomalous, then the imaging sensor may pass the test, however, a calibration procedure may be needed before a picture taken using the imaging sensor is ready for the user during in-the-field use. In that case, the test continues with storing calibration data or a calibration map that identifies the anomalous columns, and such calibration data may be stored within non-volatile data storage that is shipped or associated together with the imaging sensor. A calibration routine is then run during in-the-field use of the imaging sensor, which reads the non-volatile data storage and makes corrections to, in one instance, all of the pixel values of an identified anomalous pixel column.

The process may be part of verification testing that is performed in a high volume manufacture setting, e.g. at the wafer level for an imaging sensor die, at a camera module level in which the imaging sensor die has been integrated or installed together with imaging optical components, or at a system level where the camera module or imaging sensor die has been installed into a consumer electronics product such as a smart phone, a tablet computer, a laptop computer, a desktop computer, or a home entertainment system.

Figure 1:
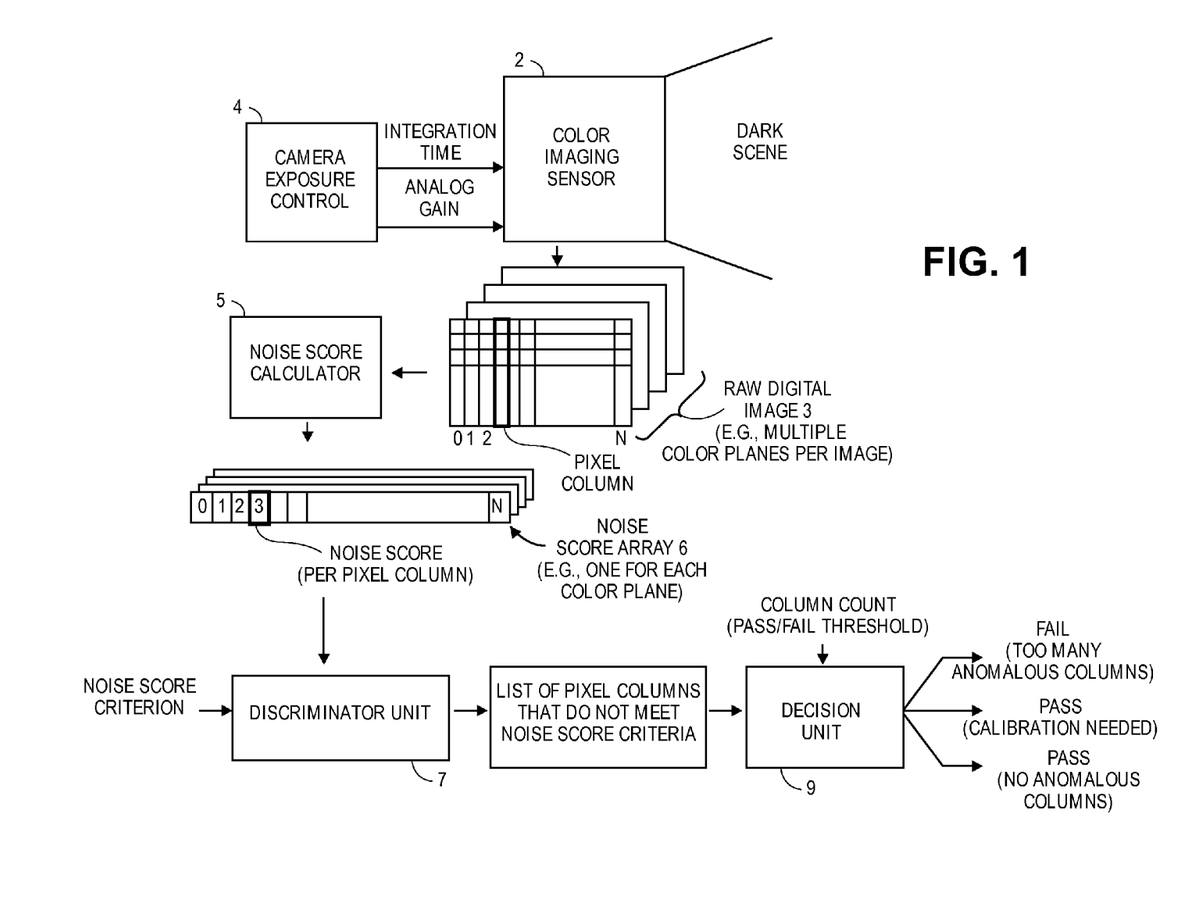
FIG. 1 is a block diagram of a system for testing an imaging sensor.
Figures 4, 5:
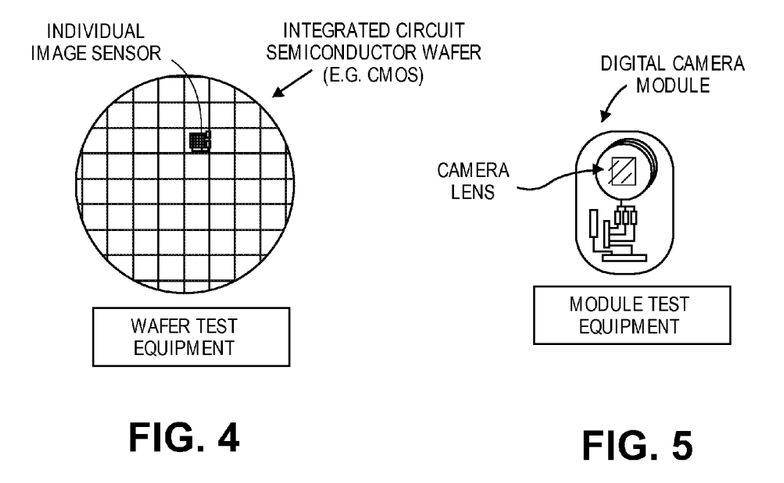
FIG. 4 illustrates one instance in which the imaging sensor may be tested.
FIG. 5 shows another instance of testing the imaging sensor.

FIG. 1 shows a system for testing an imaging sensor 2 in accordance with an embodiment of the invention. A dark scene is created for the imaging sensor 2, by, for example, closing a mechanical shutter of a camera device in which the imaging sensor is integrated, or by simply covering the camera lens. In another embodiment, the imaging sensor 2 may still be part of an integrated circuit semiconductor wafer, and as such the wafer itself may be placed in a dark chamber. It should therefore be noted that the test system depicted in FIG. 1 is applicable to various instances in which the imaging sensor 2 may find itself, and several examples of these are given in FIGS. 4-6 described below. Note that the term "dark scene" refers to essentially no light source being represent. The scene may be dark in that the digital image 3 that is produced by the imaging sensor (as a capture of the dark scene) has no pixel intensity values that are greater than 10% of the full scale or maximum digital number (DN), except for those in an anomalous pixel column. As explained above, a dark scene is needed because the anomaly that is being detected here, namely a brighter column, is either not likely to be apparent to a human being or is simply absent due to changes in the photo sensor signal conditioning path, when the captured scene is bright or even dimly lit.

The system also includes a camera exposure control unit 4 that signals the imaging sensor 2 to capture the digital image 3 of the dark scene. This signaling includes configuring the appropriate exposure setting into the imaging sensor 2, including, in particular, the parameters of integration time and photo sensor signal path analog gain, e.g., by writing binary values into appropriate configuration or control registers of the sensor 2. Suggestions on setting these two parameters for advantageous results will be given below. The system also includes a noise score calculator 5 that is to compute a separate noise score for each of the pixel columns that have been selected in the image 3. An example of how to calculate the noise score is given below. The noise score calculator 5 produces a noise score array 6, which contains a separate noise score for each of the selected pixel columns. A discriminator unit 7 is also provided that is able to find which ones of the pixel columns have noise scores that do not meet a predetermined criterion and are therefore anomalous columns. The discriminator unit 7 identifies the anomalous columns by producing a list of pixel columns that do not meet the noise score criterion. A decision unit 9 has a programmable pass/fail threshold which may be a column count that is used to indicate whether the imaging sensor 2 has or has not passed this quality test. When the number of anomalous columns identified by the discriminator unit 7 is greater than the programmable threshold column count, then the imaging sensor 2 has not passed the quality test. If an anomalous column is not found by the discriminator unit 7, then the imaging sensor 2 may be deemed to have passed the test (without qualifications). On the other hand, if at least one anomalous column was found but fewer than the threshold count, then the imaging sensor 2 is still considered to pass the test, however, a calibration procedure may need to be performed each time a picture is to be taken using the sensor 2.

Figure 2:
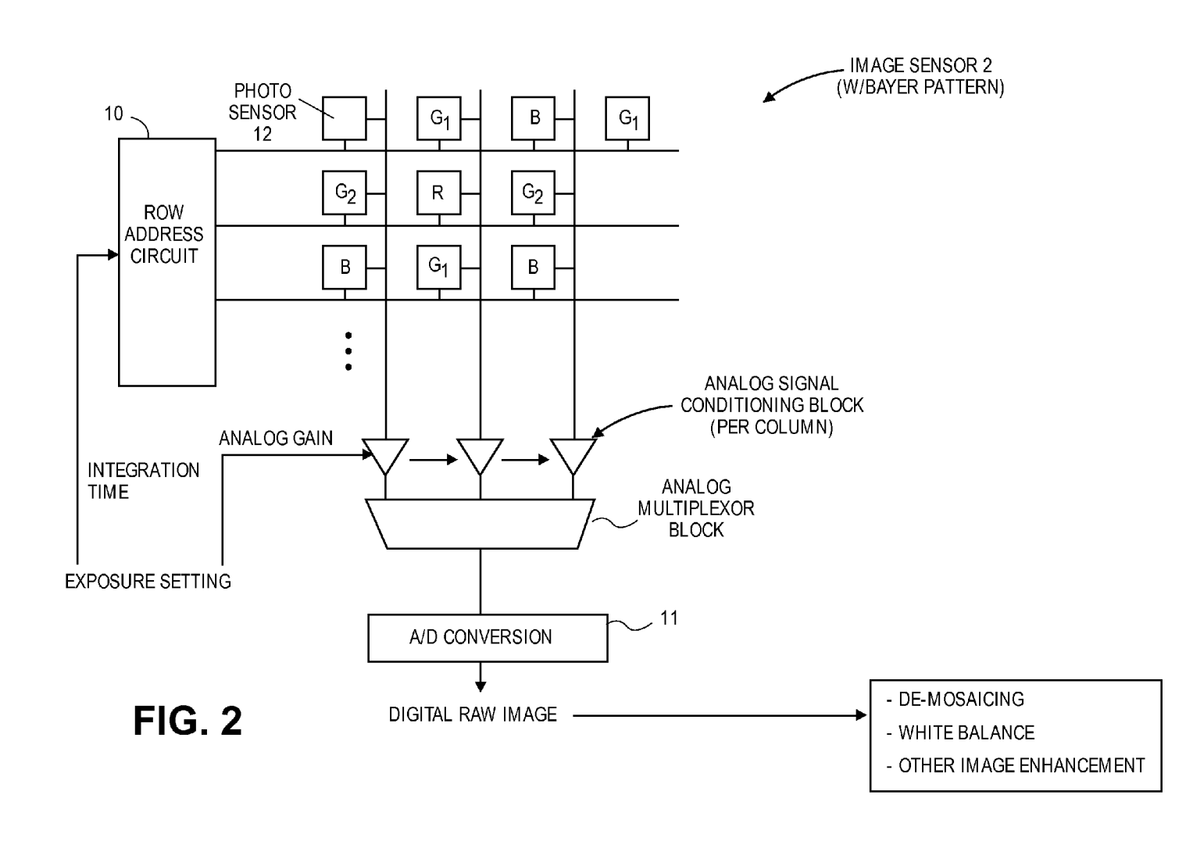
FIG. 2 is a block diagram of an example color imaging sensor.

Turning now to FIG. 2, an example of the imaging sensor 2 is shown that has a Bayer-type color filter array or mosaic. In this embodiment, the imaging sensor 2 has an array of photo sensors where each is tuned to sense a single color, in this case, one of the three primary or additive colors of red, green, and blue. Of course, the testing techniques described here will also work for other color imaging sensors having different color filter mosaics. In general, such sensors may be implemented using various fabrication techniques, although a complimentary metal oxide semiconductor (CMOS) process is particularly useful as it enables lower cost integration of timing, control and image processing logic onto the same die as the array of photo sensors.

As depicted in FIG. 2, the control logic may include a row address circuit 10 that is responsible for resetting and controlling the photo sensors, so as to allow them to respond to incident light in accordance with a selected integration time. As part of the exposure setting, an analog signal conditioning block is configured. This block applies an analog gain to the photo sensor signal path, somewhere between the photo sensor and an analog-to-digital (A/D) conversion block 11. There are several different architectures possible for the analog signal path between the individual photo sensors and the A/D conversion circuitry 11, and these are generally depicted here by analog signal conditioning blocks and an analog multiplexor block. In some cases, there is a separate dedicated analog amplifier for each column. However, in other instances, multiple columns share a single analog amplifier. As yet another alternative, multiple columns may be multiplexed by an analog multiplexor block, and the analog gain is actually applied after or downstream of the multiplexor block but upstream of the A/D conversion circuitry 11. The latter produces a digital raw image, i.e. one that has been minimally processed and that will need to be further enhanced by being subjected to image processing operations such as de-mosaicing, white balance and gamma correction for example, before being useful to a user.

Referring back to FIG. 1, the image 3 produced by the imaging sensor 2 may in some cases be separated into multiple color planes, where in this example there may be four color planes such as those corresponding to the red, green1, green2, and blue channels of a conventional Bayer pattern (see FIG. 2). The noise score calculator 5 would then operate on each color plane separately, in computing a separate noise score for each of the pixel columns in each of the color planes. This results in a separate noise score array 6 being created, one for each color plane. Further, the discriminator unit 7 when identifying columns whose noise score does not meet a criterion would do so for each of the color planes separately. In addition, the decision unit 9 may render its fail decision merely based on finding that there are too many anomalous columns in a single color plane. An example of a quality test process that can be implemented by the components of the system shown in FIG. 1 will be described next.

A process for finding an anomalous pixel column produced by the imaging sensor 2 may proceed as follows. The imaging sensor 2 is signaled to capture a digital image of a dark scene, where the image should be captured at full sensor resolution. In addition, the raw digital image 3 should not be cropped. As was suggested above, the integration time and analog gain parameters should be set so as to provide a bias signal to the photo sensor cells, where this should also be selected in view of the current temperature of the imaging sensor. Note that dark current accumulation within a photo sensor, in the case of a CMOS sensor, varies with the temperature of the sensor, roughly doubling every 5-7 degrees centigrade; it also varies linearly with integration time. For instance, at about 16× analog gain, about 133 msec. integration time, and a sensor temperature of about 50 degrees centigrade, such conditions produce about 1.5 e− of bias, assuming a dark current level of about 100 e−/second. More generally, both the integration time and the analog gain may be set to fall within, for example, an upper 25% of the available range for each, when the sensor is at about 50 degrees centigrade. In this way, the clipping effects mentioned above may be reduced or even eliminated.

The following image processing operations may then be performed on the raw image in order to calculate a noise score for each column (also referred to here as a VFPN score or a column score). Such operations may be performed by the noise score calculator 5, which may be implemented as a hardwired logic circuit or alternatively as a programmed processor. Operation begins with separating the raw image frame into its constituent color planes. In the case of a Bayer color filter array or mosaic, assuming the imaging sensor has a full resolution of 2604×1952 photosensors, there are four color planes each having about 1302×976 pixels. This is just an example of course, as other color filter mosaics with different imaging sensor resolutions will result in a fewer or greater number of color planes and also different color plane sizes.

Next, operation proceeds with, in each color plane, computing a respective column value that represents at least some of the pixels in the column. The respective column value may be a measure of the central tendency of the column. For example, the measure of the central tendency may be the average of all pixels in the column. This results in a one-dimensional array of, in this case, 1302 column values being computed, for each color plane.

Next, operation proceeds with calculating a column score or also referred to as a VFPN or noise score for each column. In one embodiment, differences between the measure of the central tendency of the column and those of two or more neighbor columns, respectively, are computed; these differences are then combined to form the noise score for the column. For example, the VFPN score for each column may be calculated as follows:

a. Subtract the column (n−2) average from the current column (n) average;
 b. Subtract the column (n−1) average from the current column (n) average;
 c. Subtract the column (n+1) average from the current column (n) average;
 d. Subtract the column (n+2) average from the current column (n) average; and Sum the four differences computed in a-d, take the absolute value of the sum, and then store this value as the VFPN score for the current column (n).

Note that in some cases, the VFPN score for the first few columns and the last few columns (in each color channel) may be set to zero, because such columns may be considered "don't care" columns. In other words, those columns even if anomalous may not be apparent to a human user viewing the image. It should also be noted that while in the above example the comparison between the column value of a current column (n) and that of its neighbors involved computing the difference between their respective column values, an alternative may be to compare the column value to a reference value such as an expected value.

Once the noise score arrays 6 have been computed as above, the discriminator unit 7 (see FIG. 1) may proceed with creating a list of all pixel columns (in each color channel) that exceed a predetermined VFPN threshold or noise score criterion. The following should be noted regarding this detection threshold. As was suggested above, a detection threshold in the range of approximately 0.1 e− to 1.0 e− may be expected of the quality test described here. At the above-specified example operating conditions of approximately 16× analog gain, about 133 msec integration time, and assuming a pixel charge capacity (in the photo sensor) of about 4,100 electrons, the full scale range would be about 256 e−, corresponding to an ADC step size of about 0.25 e−/DN (electrons per ADC bin). An isolated 2 DN offset in a single column (which may be equivalent to about 0.5 e− photo sensor column noise level) would result in a noise score of 8; this may be adopted as the noise score criterion or threshold (in one embodiment). The discriminator unit 7 so configured will produce a list of all columns whose noise score exceeds the noise score criterion of, in this example, 8.

The testing process continues with making a decision (via a decision unit 9) as to whether the imaging sensor 2 has passed the test. If the number of columns found to exceed the detection threshold is excessive, then the imaging sensor fails the test. Of course, if there are no columns whose noise scores exceed the detection threshold, then the imaging sensor may pass without qualifications. On the other hand, the imaging sensor may pass this quality test by having at least one, but fewer than the maximum number of anomalous column; in that case, however, calibration of the imaging sensor may be needed, when taking a picture subsequently during in-the-field use of the sensor 2. This is described below in connection with FIG. 3.

In a further embodiment, the decision unit 9 will indicate that the imaging sensor 2 has failed the quality test when, within a single color plane, there are two or more anomalous columns found that are adjacent. Thus, even if there are fewer than the maximum number of anomalous columns, the imaging sensor 2 may still be considered to fail the quality test if there are two or more anomalous columns that are adjacent, that is their index values differ by only one. Other noise score criteria may alternatively be used.

As part of a calibration setup procedure, that is performed upon finding at least one anomalous pixel column, an indication that identifies one or more pixel columns as being anomalous is stored. This may be done by writing the index of the anomalous column to a non-volatile data storage device, and then associating the index value with the serial number or other identifying characteristic of the imaging senor 2. This information may be written as part of a calibration map 16 such as the one depicted in FIG. 3. The calibration map 16 may be stored in non-volatile storage 15, which may be any type of memory or register file storage contained in a consumer electronics device in which the sensor 2 has been integrated.

Figure 3:
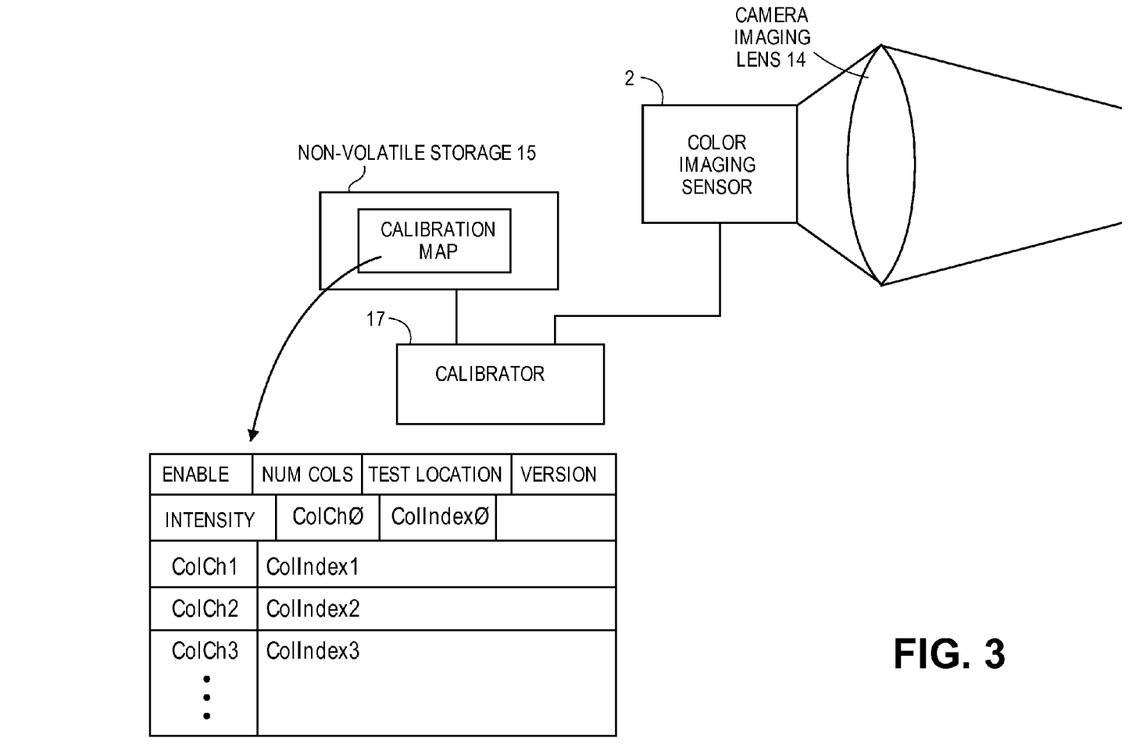
FIG. 3 is a block diagram of an electronics device having a camera function and a calibrator.

FIG. 3 shows a system having a digital camera function that can calibrate its imaging sensor 2. The non-volatile storage 15 has previously stored data therein, which in this case includes the calibration map 15 that was written as a result of the anomalous column detection process described above. In a broad sense, the data includes an index of at least one anomalous pixel column that has been previously detected for the imaging sensor 2. In this example, there are several such indices, pointing to several anomalous pixel columns, up to a maximum of 8 (that being the upper limit on the number of anomalous pixel columns that a passing imaging sensor is allowed to have). A calibrator circuit 17, which is coupled to the imaging sensor 2 and the non-volatile storage 15, is to correct a pixel column that is at the index.

The calibration map 16 may contain an Enable bit, which when set indicates that column noise calibration data has been programmed into this module or system. The numCols field indicates the number of columns that are to be calibrated (which cannot be greater than the maximum anomalous column count). The Location field indicates the location where the anomalous pixel column detection and calibration setup was performed, e.g. imaging sensor supplier, camera module integrator, or system integrator). The Version field indicates which version of the calibration map 15 this is.

The calibration map 16 identifies each anomalous column by indicating which color channel the column is in, e.g. 0=B, 1=Gb, 2=Gr, 3=R, in a ColCh field, and by indicating the index of the column which may be a number in the range 0 to N (see FIG. 1). The column having the highest noise score is reserved at ColCh0, ColIndex0, and the actual noise score of that column is written into the Intensity field.

A method for calibrating the imaging sensor 2 may proceed as follows. A current digital raw image is about to be produced by the imaging sensor 2. The calibrator 17 reads a reserved location for the Enable field in the non-volatile storage 15 and finds that it is set, which means that calibration of the imaging sensor 2 is needed. It then continues with reading ColCh0 and ColIndex0, which identify the color plane and the index, within a digital raw image, of an anomalous pixel column that had the highest noise score during previous testing. The calibrator 17 may read any additional ColCh and ColIndex fields, to identify the rest of the anomalous pixel columns. It then proceeds with correcting the identified pixel columns in the current digital raw image. The correction may include replacing an intensity value of each pixel in an identified column with a combination of the intensity values of one or more neighboring adjacent pixels in the same color plane (e.g., an average of a left neighbor pixel and a right neighbor pixel).

In one embodiment, the calibration method determines a measure of the scene-wide lighting that was present when the current digital raw image was captured. The correction to an identified pixel column is only performed when the measure of scene-wide lighting is dim, but not when the measure of scene-wide lighting is bright. That is because the calibration may not be needed for bright scenes, because as was discussed earlier the bright vertical streaks are not apparent or are absent under those conditions. One advantageous way for determining a measure of scene-wide lighting involves determining the analog gain that was applied to a photo sensor signal path in the imaging sensor, while the current image was being captured. The determined measure of scene-wide lighting is dim when the analog gain is high, and bright when the analog gain is low.

Figure 6:
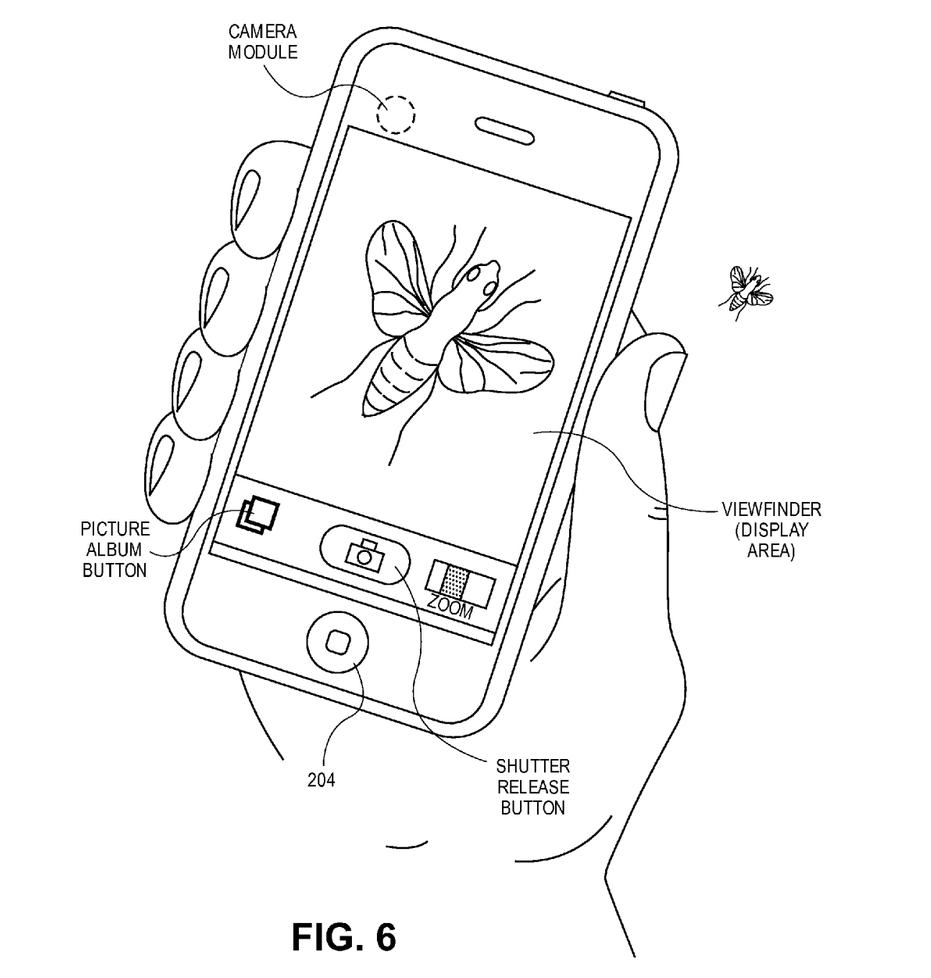
FIG. 6 shows yet another instance in which the imaging sensor may be tested.

The column noise quality testing procedures described above are expected to be most useful in a high volume manufacture production line test, such as wafer level testing of imaging sensors (see FIG. 4), testing by a camera module integrator (FIG. 5), or testing by a system integrator of a consumer electronic product (FIG. 6). The quality testing process may alternatively be performed during in-the-field use of the consumer electronic product, in a way that is transparent to the user. In particular, the elements of the test system shown in FIG. 1 including the camera exposure control unit 4, noise score calculator 5, discriminator unit 7, and decision unit 9 may all be implemented by suitably programming, for instance, an applications processor or a system on a chip of the consumer electronic product, as a form of a built-in self-test for the camera function. The test process in that case may be triggered automatically when software detects that the camera lens is entirely blocked off from light, e.g. an essentially black image is produced by the imaging sensor; this may signify that the imaging sensor is exposed to a dark field such that the test may be performed. The results of the test, including identification of anomalous columns, may then be automatically reported to a manufacturer or distributor of the consumer electronic product, by sending a message over the Internet to a remote server that provides a report on the health of the consumer electronic product.

As explained above, an embodiment of the invention may be a machine-readable medium (such as microelectronic memory) having stored thereon instructions, which program one or more data processing components (generically referred to here as a "processor") to perform the digital image processing operations described above including noise and signal strength measurement, filtering, mixing, adding, inversion, comparisons, and decision making. In other embodiments, some of these operations might be performed by specific hardware components that contain hardwired logic (e.g., dedicated digital filter blocks). Those operations might alternatively be performed by any combination of programmed data processing components and fixed hardwired circuit components.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For example, while FIG. 1 and the particular example of the VFPN test described above refer to the raw digital image 3 as being composed of multiple color planes, such that the noise score calculations and the identification of anomalous pixel columns occurs on a per color plane basis, there are some imaging sensors that do not have a color filter mosaic and are able to produce full color pixel values (e.g., RGB pixel values) directly at the output of the analog-to-digital conversion circuitry 11 (see FIG. 2). The testing described above may also be useful for such color imaging sensors. The description is thus to be regarded as illustrative instead of limiting.

What is claimed is:

1. A method for finding an anomalous pixel column produced by an imaging sensor, comprising:
   signaling the imaging sensor to capture a digital image of a dark scene, wherein the dark scene has no visible light and no infrared light that would produce a substantial response from the imaging sensor, wherein the digital image includes a plurality of pixel columns;
   for each of the plurality of pixel columns, computing a respective column value that represents some of the pixels in the pixel column;
   for each of the plurality of pixel columns, making a respective comparison between the respective column value of the pixel column and a reference value;
   computing a respective column score, for each of the plurality of pixel columns, based on the respective comparison; and
   storing an indication that identifies one of the plurality of pixel columns as anomalous when the respective column score of said one of the plurality of pixel columns does not meet a criterion that represents a detection threshold for column noise of less than one equivalent pixel electron.

2. The method of claim 1 wherein the scene is dark in that the captured digital image has essentially no pixel intensity values that are greater than about 10% of full scale or maximum digital number, except for those in any anomalous pixel column.

3. The method of claim 1 wherein computing the respective column value that represents some of the pixels in the pixel column comprises summing all pixels in the pixel column.

4. The method of claim 1 wherein the digital image comprises a plurality of color planes and is a raw image.

5. The method of claim 3 wherein the respective column value is computed from the digital image being a raw image that has been captured at full resolution of the imaging sensor and has not been cropped.

6. The method of claim 1 wherein the imaging sensor has a color filter mosaic or array and the plurality of pixel columns are in a single color plane of the digital image, and the respective column value is computed from the single color plane and not other color planes of the digital image.

7. The method of claim 3 wherein the reference value comprises a respective column value of an adjacent neighbor column of the plurality of pixel columns.

8. The method of claim 7 wherein the respective comparison comprises a difference computed between the respective column value of the pixel column and the respective column value of the adjacent neighbor column.

9. A system for testing a color imaging sensor, comprising:
   means for creating a dark scene for the color imaging sensor, wherein the dark scene has no visible light and no infrared light that would produce a substantial response from the color imaging sensor;
   means for signaling the color imaging sensor to capture a digital image of the dark scene, wherein the digital image comprises a plurality of pixel columns;
   means for computing a separate noise score for each of the plurality of pixel columns; and
   means for identifying one or more pixel columns whose noise scores do not meet a criterion that represents a detection threshold for column noise of less than one equivalent pixel electron.

10. The system of claim 9 further comprising:
    means for separating the digital image into a plurality of color planes, each color plane having the plurality of pixel columns,
    wherein said means for computing is to compute a separate noise score for each of the plurality of pixel columns in each of the plurality of color planes,
    and wherein said means for identifying is to identify the one or more pixel columns whose noise scores do not meet the criterion, for each of the plurality of color planes.

11. The system of claim 9 further comprising:
    means for indicating that the color imaging sensor has failed a quality test, when there are more than a predetermined threshold number of pixel columns whose noise scores do not meet the criterion; and
    means for indicating that the color imaging sensor has passed the quality test but needs to be calibrated, when there are fewer than the predetermined threshold number of pixel columns whose noise scores do not meet the criterion.

12. The system of claim 9 wherein the noise score computing means computes a separate measure of central tendency of each of the plurality of pixel columns and computes differences between the measure of the central tendency of the pixel column and a plurality of neighbor columns, respectively and combines the differences to form the noise score for the pixel column.

13. A system for testing a color imaging sensor, comprising:
    an exposure control unit that is coupled to the color imaging sensor, to configure an exposure setting and signal the color imaging sensor to capture a raw digital image of a dark scene at the configured exposure setting, wherein the dark scene has no visible light and no infrared light that would produce a substantial response from the color imaging sensor;

a noise score calculator that is coupled to the color imaging sensor to receive the raw digital image and compute a separate noise score for each of a plurality of pixel columns in the raw digital image; and a discriminator unit coupled to the noise score calculator to find which ones of the plurality of pixel columns have noise scores that do not meet a criterion and are deemed anomalous columns that represents a detection threshold for column noise of less than one equivalent pixel electron.

14. The system of claim 13 further comprising:

a decision unit coupled to the discriminator unit and having a programmable threshold, wherein the decision unit is to indicate that the color imaging sensor has not passed a quality test when a number of anomalous columns found by the discriminator unit is greater than the programmable threshold.

15. The system of claim 14 wherein the decision unit is to indicate that the color imaging sensor has passed the quality test but needs to be calibrated, when the number of anomalous columns found by the discriminator unit is less than the programmable threshold.

16. The system of claim 15 wherein the raw digital image comprises a plurality of color planes, and wherein the noise score calculator is to compute, for each of the plurality of color planes, a separate noise score for each of the plurality of pixel columns in the color plane.

17. The system of claim 16 wherein the decision unit is to indicate that the color imaging sensor has not passed the quality test when, within a single color plane, there are two or more anomalous columns found that are adjacent.

18. The system of claim 13 wherein the exposure control unit is to set integration time and analog gain of the color imaging sensor to within an upper 25% of available range for each, when the color imaging sensor is to be tested at about 50 degrees centigrade.

* * * * *